United States Patent
Sharmak et al.

(10) Patent No.: US 10,501,372 B2
(45) Date of Patent: Dec. 10, 2019

(54) TWO-COMPONENT MORTAR MASS AND USE THEREOF

(71) Applicant: Hilti Aktiengesellschaft, Schaan (LI)

(72) Inventors: Anna Sharmak, Augsburg (DE); Armin Pfeil, Kaufering (DE); Beate Gnass, Gersthofen (DE); Memet-Emin Kumru, Augsburg (DE); Jens Bunzen, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 364 days.

(21) Appl. No.: 15/323,318

(22) PCT Filed: Jul. 30, 2015

(86) PCT No.: PCT/EP2015/067524
§ 371 (c)(1),
(2) Date: Dec. 30, 2016

(87) PCT Pub. No.: WO2016/016378
PCT Pub. Date: Feb. 4, 2016

(65) Prior Publication Data
US 2018/0170808 A1    Jun. 21, 2018

(30) Foreign Application Priority Data
Jul. 31, 2014   (EP) ..................................... 14179228

(51) Int. Cl.
| | | |
|---|---|---|
| *C04B 26/32* | (2006.01) | |
| *C04B 28/06* | (2006.01) | |
| *C04B 40/06* | (2006.01) | |
| *C04B 24/00* | (2006.01) | |
| *C08F 220/28* | (2006.01) | |
| *C08F 220/20* | (2006.01) | |
| *C08F 220/34* | (2006.01) | |
| *C08F 230/08* | (2006.01) |

(52) U.S. Cl.
CPC .............. *C04B 26/32* (2013.01); *C04B 24/00* (2013.01); *C04B 28/06* (2013.01); *C04B 40/065* (2013.01); *C08F 220/28* (2013.01); *C08F 220/20* (2013.01); *C08F 220/34* (2013.01); *C08F 230/08* (2013.01); *C08F 2220/281* (2013.01); *C08F 2800/20* (2013.01)

(58) Field of Classification Search
CPC ......... C04B 26/32; C04B 24/00; C04B 24/06; C04B 40/065; C04B 28/06; C08F 220/28
See application file for complete search history.

(56) References Cited

U.S. PATENT DOCUMENTS

| | | |
|---|---|---|
| 2011/0034627 A1 | 2/2011 | Boudet et al. |
| 2011/0236612 A1 | 9/2011 | Kumru et al. |
| 2013/0237634 A1* | 9/2013 | Buergel .................. C04B 26/06 523/130 |

FOREIGN PATENT DOCUMENTS

| | | |
|---|---|---|
| EP | 2 371 782 A2 | 10/2011 |
| WO | 2009/130298 A1 | 10/2009 |

OTHER PUBLICATIONS

International Search Report dated Sep. 2, 2015 in PCT/EP2015/067524 filed Jul. 30, 2015.

* cited by examiner

*Primary Examiner* — John E Uselding
(74) *Attorney, Agent, or Firm* — Grüneberg and Myers PLLC

(57) ABSTRACT

A two-component mortar mass comprises a resin component (A), which contains at least one radically curable resin as a curable constituent, and a curing component (B), which contains a curing agent for the radically curable resin of the resin component (A). The radically curable resin can be obtained by reaction of an at least difunctional isocyanate with a hydroxy-functional silane and a hydroxy-functional, ethylenically unsaturated compound. The hydroxy-functional silane is the reaction product of a cyclic compound from the group of cyclic carbonates, lactones, and carbamates with a silane compound selected from the group of amino-functional, hydroxy-functional or mercapto-functional silanes.

23 Claims, No Drawings

TWO-COMPONENT MORTAR MASS AND USE THEREOF

The invention relates to a two-component mortar mass having a resin component (A), which comprises at least one radically curable resin, and a curing component (B) for the resin of the resin component (A). Furthermore, an object of the invention is the use of the mortar mass for chemical fastening of parts such as threaded anchor rods, iron reinforcement bars, threaded sleeves, and screws in drilled holes that are introduced into a mineral substrate.

For secure fastening of parts such as threaded anchor rods, iron reinforcement bars, threaded sleeves, and screws in a mineral substrate such as concrete, natural stone or stucco, the drilled holes for accommodation of the parts to be fastened are first drilled into the mineral substrate with the corresponding dimensions. Subsequently, the drilled holes are freed of drilling dust, and the two-component mortar mass is introduced into the drilled hole after the resin component is mixed with the curing component. Afterward, the part to be fastened is introduced into the drilled hole filled with the mortar mass and adjusted. After the mortar mass has cured due to the reaction of the resin component with the curing component, a firm hold of the part in the mineral substrate is achieved.

The support behavior of fastened parts depends on several influence variables, which are usually classified as internal and external variables. The internal influence variables include the chemical composition of the mortar mass, its production process, and the packaging of the mortar mass, which typically comprises components present in two separate containers.

The external influence variables include, among other things, the method of drilled hole cleaning, the quality of the mineral substrate, for example of the concrete, its moisture and its temperature, as well as the method of drilled hole production.

It is furthermore known that the mechanical properties of the cured mortar mass are significantly influenced by the quality of drilled hole cleaning and by the moisture of the mineral substrate. In wet drilled holes and/or drilled holes that have only been cleaned poorly of drilling dust, a significant decrease in performance occurs, which shows itself in reduced load values of the cured mortar mass.

Two-component mortar masses on the basis of urethane (meth)acrylate resins are known from EP 0 432 087 and EP 0 589 831.

AU 2010200119 A1 shows that the adhesion of such mortar masses in wet drilled holes can be improved by prior treatment with (meth)acryloxyalkyl trialkoxysilanes.

In EP 2 371 782 A2, two-component mortar masses are disclosed, which contain a urethane (meth)acrylate as a resin component and at least one (meth)acryloxyalkyl trialkoxysilane and/or a poly(meth)acryloxyalkyl silsesquioxane as a further constituent. The addition of the silane compounds is supposed to result in improved adhesion of the mortar masses to the surface of semi-cleaned and/or wet drilled holes in concrete.

DE 10 2009 019 898 A1 relates to the use of a two-component mortar mass for fastening of anchoring elements in holes, wherein the compound comprises at least one silane-terminated synthetic resin and, in addition, a water-based curing component. The silane-terminated synthetic resin is supposed to be obtainable by means of reaction of at least one resin containing vinyl groups, for example, with a silane compound containing amino groups and/or thiol groups. Epoxy (meth)acrylates, unsaturated polyester resins, vinyl ester resins, urethane (meth)acrylates, hydroxyalkyl (meth)acrylates, alkyl, cycloalkyl or aryl mono, di, tri, tetra, penta or hexa-ol-(meth)acrylates or (poly)(meth)acrylates, or mixtures thereof, are named as resins containing vinyl groups. However, only the reaction of an isocyanate with an aminosilane is indicated as an example.

WO 2011/072789 A1 relates to a two-component or multi-component fastening mortar for mortaring anchoring means in place in holes or gaps, on the basis of radically curing, unsaturated reaction resins. The mortar is further supposed to contain silanes having reactive groups, which can participate in the polymerization of the radically curing unsaturated reaction resin. As silanes, particularly those that carry at least one amino, mercapto, epoxy, isocyanate, alkenyl, (meth)acryloyl and/or anhydride group and contain at least one Si-bound hydrolyzable group are mentioned.

WO 2009/130298 A1 discloses silylated polyurethanes that can be obtained by means of reaction of at least one polyol compound having a molecular weight of 4,000-20,000 Dalton with a diisocyanate, at a stoichiometric excess of the diisocyanate compound relative to the OH groups of the polyol compound, thereby forming an isocyanate-terminated polyurethane prepolymer, and subsequent reaction of the polyurethane prepolymer with one or more OH-terminated silanes. The silylated polyurethanes produced in this manner are used as adhesives, sealants or coating agents.

WO 2013/060767 A2 describes, in general, a method for the production of a silane-functional oligomer, for example of an alkoxy silane polyurethane, which can be used as a cross-linkable component of a coating. The method comprises reaction of an amino alkyl silane with a cyclic carbonate, lactone or lactam, causing the formation of a hydroxy-functional or imino-functional silane intermediate product, and reaction of the silane intermediate product with a diisocyanate for the formation of a silane-functional polyurethane, wherein the molar ratio of the total proportion of the OH groups or NH groups on the silane intermediate product to the diisocyanate lies in the range of 1.8 to 2.2, preferably at 2.0, so that the resulting silane polyurethane is essentially free of isocyanate groups.

The mortar masses known in the state of the art already show an improvement in the load values in wet drilled holes. However, it can be shown that the improvement in properties achieved by means of the use of compounds containing silane can decrease over time.

As compared with the known state of the art, a continued need therefore exists for two-component mortar masses having good adhesion in wet drilled holes, which compounds are easy to process and in which the mechanical properties of the cured mortar masses are aging-resistant.

It has surprisingly been shown that this task is accomplished by a two-component mortar mass according to claim 1.

Preferred embodiments of the mortar mass according to the invention are indicated in the dependent claims, which can optionally be combined with one another.

Furthermore, an object of the invention is use of the mortar mass for chemical fastening of parts such as threaded anchor rods, iron reinforcement bars, threaded sleeves, and screws in drilled holes that are present in a mineral substrate, preferably concrete.

In its general form, the invention comprises a two-component mortar mass having a resin component (A), which contains at least one radically curable resin as a curable constituent, and a curing component (B), which contains a curing agent for the radically curable resin of the resin component (A), wherein the radically curable resin can be obtained by means of reaction of an at least difunctional component that has two or more reactive groups (RGA), with a silane intermediate compound and an ethylenically unsaturated compound, wherein the silane intermediate compound and the ethylenically unsaturated compound have active functional groups (AG), in each instance, which react with the reactive groups (RG-A), causing the formation of a covalent bond, wherein the silane intermediate compound is the reaction product of a cyclic organic compound with a functionalized silane compound, which has at least one reactive group (RG-B), wherein the cyclic organic compound has the active functional group (AG) or a precursor for it, and a reactive group (RG-C) that reacts with the reactive group (RG-B) of the functionalized silane compound, causing the formation of the silane intermediate compound.

The proportion of the silane intermediate compound in the mortar mass used for reaction with the difunctional component amounts to at least about 2 wt.-%, with reference to the weight of the organic constituents of the resin component (A).

The reactive groups (RG-A) on the at least difunctional component, as compared with the active groups (AG) on the silane intermediate compound, are preferably present at most in a stoichiometric ratio, preferentially in insufficiency. In this way, it is guaranteed that the radically curable resin is free of reactive groups (RG-A).

The reactive groups (RG-A) are preferably selected from the group consisting of carboxyl groups, isocyanate groups, oxirane groups, imido groups and combinations thereof. Preferably, at least difunctional carbonic acids, isocyanates, and epoxies can be used as an at least difunctional component.

The active groups (AG) on the silane intermediate compound are preferably selected from the group consisting of carboxyl groups, hydroxy groups, amino groups, thio groups and combinations thereof.

The cyclic organic compound is preferably selected from the group consisting of cyclic anhydrides, carbonates, thiocarbonates, thiocarbamates, carbamates, ureas, lactones, lactams and combinations thereof. Preferably, the cyclic compound reacts with the functionalized silane compound, with ring opening taking place, causing the formation of the silane intermediate compound having the active group (AG).

Preferably, a hydroxy silane, mercapto silane, an aminosilane or a mixture thereof serves as a functionalized silane compound.

Particularly preferably, the functionalized silane compound carries at least one Si-bound hydrolyzable group. The Si-bound hydrolyzable group is preferably a $C_1$-$C_4$ alkoxy group.

According to a particularly preferred embodiment, the two-component mortar mass according to the invention comprises a resin component (A), which contains at least one radically curable resin as the curable constituent, and a curing component (B), which contains a curing agent for the resin of the resin component (A).

In this embodiment, the at least difunctional component is an at least difunctional isocyanate, and the silane intermediate compound is a hydroxy-functional silane.

The radically curable resin of component (A) can thereby be obtained by reaction of an at least difunctional isocyanate with a hydroxy-functional silane, preferably an alkoxy silane, and a hydroxy-functional, ethylenically unsaturated compound.

The hydroxy-functional silane is the reaction product of a cyclic compound from the group of cyclic carbonates, lactones, and lactams, with a silane compound selected from the group of amino-functional, hydroxy-functional or mercapto-functional silanes.

In an alternative embodiment, a polyester having terminal carboxyl groups can be used as an at least difunctional component.

Fastening of parts using the two-component mortar mass according to the invention results in high load values both for drilled holes cleaned while dry and for semi-cleaned and/or wet drilled holes, which values are clearly increased as compared with silane-free compounds and furthermore remain stable over a long time. It is assumed that the covalent bond of the silane groups to the urethane (meth) acrylate resin results in better incorporation of the silane groups into the polymer network, even before curing of the mortar mass.

In general, the silyl compounds described in the state of the art, which are introduced into the resin composition by way of additional additives, merely demonstrate a boundary surface effect. If the proportion of the silyl compounds in the resin composition is too low, sufficient silyl groups are no longer available at the boundary surface to the substrate. Surprisingly, the mortar masses according to the invention already demonstrate a permanent boundary surface effect at a relative low proportion of the silyl-modified resin component, which effect leads to a low decrease in load values in wet drilled holes.

In the sense of the invention, a "two-component mortar mass" is understood to be a mortar mass that consists of a curable resin component and a curing component for the resin component, wherein the resin component and the curing component are stored separately from one another, so that during storage, no reaction of the curing component with the resin component takes place. Hardening of the reactive resin is started by means of mixing of the curing component with the reactive resin directly before use of the mortar mass. Here and in the following, the term "silane" or "silane compound" refers to an optionally substituted organosilane having Si—C—, Si—O— or Si—N bonds, for example with alkyl and/alkoxy radicals, which in turn can be substituted and/or functionalized.

The at least difunctional isocyanate for the production of the radically polymerizable resin can be an aromatic isocyanate, an aliphatic isocyanate, particularly a cycloaliphatic isocyanate, and a pre-polymer containing isocyanate groups, which can also be used in a mixture with one another.

Examples of suitable aliphatic and aromatic isocyanates comprise m-phenylene diisocyanate, toluylene-2,4-diisocyanate, toluylene-2,6-diisocyanate, hexamethylene-1,6-diisocyanate, tetramethylene-1,4-diisocyanate, cyclohexane-1,4-diisocyanate, hexahydrotoluylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, 4,4',4''-triphenylmethane triisocyanate, polymethylene polyphenyl isocyanate, toluylene-2,4,6-triisocyanate, and 4,4'-dimethyldiphenylmethane-2,2',5,5'-tetraisocyanate.

Diphenylmethane-4,4'-diisocyanate, diphenylmethane-2,4'-diisocyanate, and mixtures thereof are jointly referred to as MDI, and all of them can be used. Toluylene-2,4-diisocyanate, toluylene-2,6-diisocyanate, and mixtures thereof are generally referred to as TDI, and all of them can be used, as well.

Preferably, the polyisocyanate is selected from the group that consists of diphenylmethane diisocyanate (MDI), polymer diphenylmethane diisocyanate (PMDI), toluylene diisocyanate (TDI), hexane diisocyanate (HDI), isophorone diisocyanate (IPDI), and mixtures thereof.

Isocyanate prepolymers that are produced by means of reaction of a stoichiometric excess of any desired polyisocyanate with an isocyanate-reactive compound as a chain lengthener can also be used, optionally in a mixture with the aforementioned aromatic and aliphatic isocyanates.

Examples of such chain lengtheners are bivalent alcohols such as ethane diol, diethylene glycol, triethylene glycol and polyethylene glycol, propane diol, dipropylene glycol, tripropylene glycol and polypropylene glycol, 1,4-butane diol, 1,6-hexane diol, neopentyl glycol and diethanolamine, furthermore aromatic alcohols such as Bisphenol A and Bisphenol F or their ethoxylation products, hydrogenation products and/or halogenation products, higher-valent alcohols such as glycerin, trimethylol propane, hexane triol and pentaerythrite, polyethers containing hydroxyl groups, such as, for example, oligomers of aliphatic or aromatic oxiranes and/or higher cyclic ethers, for example of ethylene oxide, propylene oxide, styrene oxide and furan, polyethers that contain aromatic structural units in the main chain, such as, for example, the polyethers of Bisphenol A and F, as well as polyesters containing hydroxyl groups, on the basis of the aforementioned alcohols and polyethers, with dicarboxylic acids or their anhydrides, such as adipinic acid, phthalic acid, tetrahydrophthalic or hexahydrophthalic acid, HET acid, maleic acid, fumaric acid, itaconic acid, and sebacic acid.

Chain lengtheners having aromatic structural units serve for chain stiffening of the resin. Hydroxyl compounds having unsaturated structural units, such as fumaric acid, can be used to increase the cross-linking density during curing. Branched or star-shaped hydroxyl compounds as chain lengtheners, particularly trivalent and higher-valent alcohols, as well as polyethers and/or polyesters that contain their structural units result in branched or star-shaped urethane (meth)acrylates that have a lower viscosity of the resins and improved solubility in reactive diluents.

The hydroxy-functional (meth)acryl compound for the production of the radically polymerizable resin of the resin component (A) is preferably a (meth)acrylic acid hydroxyalkyl ester, such as hydroxyethyl (meth)acrylate, hydroxypropyl (meth)acrylate, polyoxymethylene (meth)acrylate, polyoxypropylene (meth)acrylate, or a (meth)acryl acid ester of multivalent alcohols, containing hydroxyl groups, such as pentaerythrite tri(meth)acrylate, glycerol di(meth)acrylate, trimethylolpropane di(meth)acrylate, and neopentyl glycol mono(meth)acrylate.

The term "(meth)acryl . . ." or " . . . (meth)acryl . . ." used here and below means that both the acryl group and the methacryl group is supposed to be covered by this term.

The silane compound used for production of the hydroxy-functional silane is preferably an amino silane with primary or secondary amino groups.

The silane group of the silane compound preferably carries at least one hydrolyzable radical, particularly an alkoxy radical. Preferably, the silane group carries at least one, preferably two, particularly preferably three alkoxy groups. Alkoxy groups having 1 to 4 carbon atoms, particularly preferably methoxy and/or ethoxy groups, are preferred.

The amino group, hydroxy group or thiol group of the amino-functional, hydroxy-functional or mercapto-functional silane compound is preferably disposed on an organic radical having 1 to 10 C atoms, preferably an alkylene group having 1 to 4 C atoms, which can optionally be substituted.

Examples of suitable amino-functional silane compounds are:

3-aminopropyl trimethoxysilane, 3-aminopropyl triethoxysilane, 3-aminopropylmethyl dimethoxysilane, 3-aminopropylmethyl diethoxysilane, 3-aminopropylethyl diethoxysilane, 3-aminopropyldimethyl ethoxysilane, 3-aminopropyldiisopropyl ethoxysilane, 3-aminopropyl tripropoxysilane, 3-aminopropyl tributoxysilane, 3-aminopropylphenyl diethoxysilane, 3-aminopropylphenyl dimethoxysilane, 3-aminopropyl tris(methoxyethoxyethoxy)silane, 2-aminoisopropyl trimethoxysilane, 4-aminobutyl trimethoxysilane, 4-aminobutyl triethoxysilane, 4-aminobutylmethyl dimethoxysilane, 4-aminobutylmethyl diethoxysilane, 4-aminobutylethyl dimethoxysilane, 4-aminobutylethyl diethoxysilane, 4-aminobutyl dimethylmethoxysilane, 4-aminobutylphenyl dimethoxysilane, 4-aminobutylphenyl diethoxysilane, 4-amino(3-methylbutyl)methyl dimethoxysilane, 4-amino(3-methylbutyl)methyl diethoxysilane, 4-amino(3-methylbutyl) trimethoxysilane, 3-aminopropyl phenyl methyl-n-propoxysilane, 3-aminopropylmethyl dibutoxysilane, 3-aminopropyl diethylmethylsilane, 3-aminopropylmethyl bis(trimethylsiloxy)silane, 1,1-aminoundecyl trimethoxysilane, N-methyl-3-aminopropyl triethoxysilane, N-(n-butyl)-3-aminopropyl trimethoxysilane, N-(2-aminoethyl)-3-aminopropyl trimethoxysilane, N-(2-aminoethyl)-3-aminoisobutylmethyl dimethoxysilane, N-(2-aminoethyl)-3-aminopropylmethyl dimethoxysilane, N-(2-aminoethyl)-3-aminopropyl tris(2-ethylhexoxy)silane, N-(6-aminohexyl)-3-aminopropyl trimethoxysilane, N-benzyl-N-(2-aminoethyl)-3-aminopropyl trimethoxysilane, bis(3-trimethoxysilanepropyl)amine, bis(3-triethoxysilanepropyl)amine, (aminoethylaminomethyl)phenethyl trimethoxysilane, 3-(m-amino-phenoxy)propyl trimethoxysilane, m- and/or p-aminophenyl trimethoxysilane, 3-(3-aminopropoxy)-3,3-dimethyl-1-propenyl trimethoxysilane, 3-aminopropylmethyl bis-(trimethylsiloxy)silane, 3-aminopropyl tris(trimethylsiloxy)silane, 3-aminopropylpentamethyl disiloxane, N,N-bis-(3-trialkoxysilane-propyl)-amine as well as mixtures thereof.

The amino-functional, hydroxy-functional or mercapto-functional silane compound is preferably reacted with a cyclic carbonate, lactone and/or carbamate, causing the formation of the hydroxy-functional silane.

Examples of suitable cyclic carbonates are 1,3-dioxolan-2-one (ethylene carbonate), 4-methyl-1,3-dioxolan-2-one (propylene carbonate), 4-ethyl-1,3-dioxolan-2-one (butylene carbonate), 4,5-dimethyl-1,3-dioxolan-2-one, 4,4-dimethyl-1,3-dioxolan-2-one, 4-hydroxymethyl-1,3-dioxolan-2-one, 4-phenoxymethyl-1,3-dioxolan-2-one, 1,3-dioxan-2-one; 5,5-dimethyl-1,3-dioxan-2-one, 5-methyl-5-propyl-1,3-dioxan-2-one, 5-ethyl-5-(hydroxymethyl)-1,3-dioxan-2-one; 4-isopropyl-5,5-dimethyl-1,3-dioxan-2-one; 4-tert-butyl-5-methyl-1,3-dioxan-2-one, 2,4-dioxaspiro[5.5] undecan-3-one and mixtures thereof.

Examples of suitable cyclic lactones are propiolactone, butyrolactone, and caprolactone.

In the embodiment described here, preferred cyclic compounds are ethylene carbonate, propylene carbonate, and butylene carbonate.

The hydroxy-functional silane that can be obtained from the reaction of the amino-functional, hydroxy-functional or mercapto-functional silane compound with the cyclic carbonate, lactone or carbamate preferably corresponds to the following Formula (I):

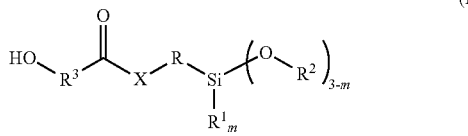

in which m is 0, 1 or 2,
$R^1$ is an alkyl radical having 1 to 4 carbon atoms,
$R^2$ is an alkyl radical having 1 to 4 carbon atoms,
$R^3$ is a divalent organic radical having 1 to 10 atoms, selected from C, N, S and/or O in the chain,
X means O, $NR^4$ or S,
wherein $R^4$ is a hydrogen atom or an alkyl radical having 1 to 10 carbon atoms, and
R is a difunctional organic group.

In the above Formula (I), $R^3$ preferably has the following structural elements (II)

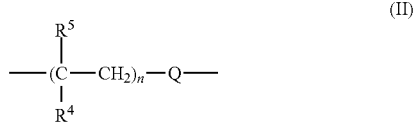

in which n is a whole number between 1 and 6,
Q means a covalent bond, O, or $NR^4$, and
$R^4$ and $R^5$, independent of one another, are a hydrogen atom or an alkyl radical having 1 to 10 carbon atoms.

The difunctional group R in the above Formula (I) is preferably a linear or branched alkylene radical having 2 to 10 C atoms, preferably 2 to 6 C atoms.

The reaction of the at least difunctional isocyanate with the hydroxy-functional silane and the hydroxy-functional, ethylenically unsaturated compound takes place in such a manner that the radically polymerizable resin of the resin component (A) obtained in this manner is essentially free of free isocyanate groups. Here, essentially free means that the resin has an NCO content of less than 2%, preferably less than 1%, and particularly preferably less than 0.3%. For this purpose, the hydroxy-functional silane and the hydroxy-functional, ethylenically unsaturated compound, together, are used in a stoichiometric excess over the isocyanate groups.

The reaction can take place in a single-stage reaction or can be carried out in two separate stages, wherein first, the hydro-functional silane and the isocyanate are reacted to produce an intermediate product, and then, the intermediate product is reacted with the hydroxy-functional, radically unsaturated compound.

The molar ratio of isocyanate groups to the hydroxy-functional silane preferably amounts to from 25:1 to 3:1, preferentially 23:1 to 3.5:1, further preferably from 23:1 to 5:1, preferentially from 20:1 to 10:1, and particularly preferably from 15:1 to 10:1.

With reference to the weight of the organic constituents in the resin component (A), the proportion of the hydroxy-functional silanes preferably lies in the range of 2 wt.-% to 7 wt.-%, further preferably of 2.5 wt.-% to 6 wt.-%, and particularly preferably of 3 wt.-% to 5 wt.-%.

Surprisingly, it was found that a clear reduction in the load value decrease in comparison with the load values of dry concrete can already be achieved at slight silane proportions in the radically polymerizable resin. It is true that an increase in the silane proportion to more than 7 wt.-% is possible, but it does not yield any better results.

The silanated (poly)urethane (meth)acrylate obtained by means of reaction of the at least difunctional isocyanate with the hydroxy-functional silane and the hydroxy-functional, ethylenically unsaturated compound can be used alone or together with other radically polymerizable resins such as vinyl esters, epoxy (meth)acrylates, and unsaturated polyester resins.

Unsaturated polyester resins are obtained by means of reaction of unsaturated dicarboxylic acids such a o- and/or iso-phthalic acid, maleic acid, and fumaric acid with dialcohols.

Usually, condensates of (meth)acrylic acid with glycidyl ethers of Bisphenol A, Bisphenol F or Novolacs are used as epoxy (meth)acrylates.

According to a further embodiment of the mortar mass according to the invention, the radically curable resin can be obtained by means of reaction of an at least difunctional epoxy with the silane intermediate compound and a carboxy-functional ethylenically unsaturated compound.

In this embodiment, the active groups (AG) on the silane intermediate compound are preferably carboxyl groups or amino groups.

The carboxy-functional ethylenically unsaturated compound is preferably an optionally substituted (meth)acrylic acid, which is reactive relative to epoxy groups.

The at least difunctional epoxy compound is preferably a glycidyl ether of Bisphenol A, Bisphenol F or of Novolacs.

The carboxy-functional or amino-functional silane intermediate compound can take place by means of reaction of a cyclic anhydride, for example of succinic acid anhydride or glutaric acid anhydride and substituted derivatives thereof, with an amino-functional or hydroxy-functional silane, with ring opening. Furthermore, cyclic carbamates and/or lactams can be used as cyclic compounds.

The reaction of the at least difunctional epoxy can take place in a single-stage reaction or a multi-stage reaction. In particular, reaction of the functionalized silane intermediate compound with an epoxy acrylate, which still has free epoxy groups, is possible.

In this manner, a radically curable, silane-terminated epoxy acrylate with silane groups covalently bound to the resin is obtained, which is essentially free of epoxy groups, i.e. the proportion of free epoxy groups lies below 2%, preferably below 1%, and preferentially below 0.3%.

The proportion of the silane intermediate compound in the resin component (A) used for reaction with the at least difunctional epoxy preferably amounts to at least 2 wt.-%, preferentially 2 to 7 wt.-%, with reference to the organic constituents of the resin component (A).

According to a preferred embodiment of the invention, the resin component (A), in all the embodiments described above, contains at least one reactive diluent as a further constituent, which diluent has at least one ethylenically unsaturated group. Suitable reactive diluents are, in particular, (meth)acrylate compounds as well as allyl and vinyl compounds.

Suitable reactive diluents are described in the applications EP 1 935 860 A1 and DE 195 31 649 A1. Preferably, the resin mixture contains a (meth)acrylic acid ester as a reactive diluent, wherein particularly preferably, aliphatic or aromatic $C_5$-$C_{15}$-(meth)acrylates are selected. Suitable examples comprise: hydroxypropyl (meth)acrylate, 1,2-ethane diol di(meth)acrylate, 1,3-propane diol di(meth)acrylate, 1,2-butane diol di(meth)acrylate, 1,4-butane diol di(meth)acrylate, trimethylolpropane tri(meth)acrylate, phenethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, acetoacetoxyethyl (meth)acrylate, isobornyl (meth)acrylate, 2-ethylhexyl (meth)acrylate, diethylene glycol di(meth)acrylate, methoxy polyethylene glycol mono(meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, Bisphenol-A-(meth)acrylate, Novolac-epoxy di(meth)acrylate, di-[(meth)acryloyl-maleoyl]-tricyclo-5.2.1.0.$^{2.6}$-decane, dicyclopentenyloxyethyl crotonate, 3-(meth)acryloyl-oxymethyltricylo-5.2.1.0.$^{2.6}$-decane, 3-(meth)cyclopentadienyl (meth)acrylate, isobornyl (meth)acrylate and decalyl-2-(meth)acrylate; PEG-di(meth)acrylates, such as PEG200-di (meth)acrylate, tetraethylene glycol di(meth)acrylate, Solketal (meth)acrylate, cyclohexyl (meth)acrylate, phenoxyethyl di(meth)acrylate, methoxyethyl (meth)acrylate, tetrahydrofurfuryl (meth)acrylate, tert-butyl (meth)acrylate, and norbornyl (meth)acrylate. Fundamentally, other usual radically polymerizable compounds can also be used, alone or in a mixture with the (meth)acrylic acid esters, for example styrene, a-methyl styrene, alkylated styrenes, such as tert-butyl styrene, divinyl benzene, and allyl compounds, wherein the representatives thereof not subject to labeling are preferred.

Particularly preferred reactive diluents are hydroxypropyl (meth)acrylate, 1,4-butane diol di(meth)acrylate, and butane diol-1,2-di(meth)acrylate.

The reaction diluent serves, for one thing, as a solvent for the radically polymerizable resin, and for another thing, as a comonomer, which participates in the radical polymerization of the resin component. The use of reaction diluents leads to a further improvement in the adhesion of the cured mortar mass to the surfaces of the mineral substrate and/or of the part to be fastened.

According to a further preferred embodiment of the invention, the resin component (A) contains at least one accelerator for the curing agent. Suitable accelerators, which are usually added to the resin mixture, are known to a person skilled in the art. These are, for example, amines, preferably tertiary amines and/or metal salts.

Suitable amines are selected from among the following compounds, which are described, for example, in the application US 2011071234 A1: dimethylamine, trimethylamine, ethylamine, diethylamine, triethylamine, n-propylamine, di-n-propylamine, tri-n-propylamine, iso-propylamine, di-iso-propylamine, tri-iso-propylamine, n-butylamine, isobutylamine, tert-butylamine, di-n-butylamine, di-iso-butylamine, tri-iso-butylamine, pentylamine, iso-pentylamine, di-iso-pentylamine, hexylamine, octylamine, dodecylamine, laurylamine, stearylamine, aminoethanol, diethanolamine, triethanolamine, aminohexanol, ethoxyaminoethane, dimethyl-(2-chloroethyl)amine, 2-ethylhexylamine, bis(2-chloroethyl)amine, 2-ethylhexylamine, bis(2-ethylhexyl)amine, N-methylstearylamine, dialkylamines, ethylene diamine, N,N'-dimethylethylene diamine, tetramethylethylene diamine, diethylene triamine, permethyl-diethylene triamine, triethylene tetramine, tetraethylene pentamine, 1,2-diaminopropane, dipropylene triamine, tripropylene tetramine, 1,4-diaminobutane, 1,6-diaminohexane, 4-amino-1-diethylaminopentane, 2,5-diamino-2,5-dimethylhexane, trimethylhexamethylene diamine, N,N-dimethylaminoethanol, 2-(2-diethylaminoethoxy)ethanol, bis(2-hydroxyethyl)oleylamine, tris[2-(2-hydroxyethoxy)ethyl]amine, 3-amino-1-propanol, methyl(3-aminopropyl) ether, ethyl(3-aminopropyl)ether, 1,4-butane diol-bis(3-aminopropylether), 3-dimethylamino-1-propanol, 1-amino-2-propanol, 1-diethylamino-2-propanol, diisopropanolamine, methyl bis(2-hydroxypropyl)amine, tris(2-hydroxypropyl)amine, 4-amino-2-butanol, 2-amino-2-methylpropanol, 2-amino-2-methyl-propane diol, 2-amino-2-hydroxymethylpropane diol, 5-diethylamino-2-pentanone, 3-methylaminopropionic acid nitrile, 6-aminohexanic acid, 11-aminoundecanic acid, 6-aminohexanic acid ethyl ester, 11-aminohexanic acid-iso-propyl ester, cyclohexylamine, N-methylcyclohexylamine, N,N-dimethylcyclohexylamine, dicyclohexylamine, N-ethylcyclohexylamine, N-(2-hydroxyethyl)cyclohexylamine, N,N-bis(2-hydroxyethyl)cyclohexylamine, N-(3-aminopropyl)-cyclohexylamine, aminomethyl cyclohexane, hexahydrotoluidine, hexahydrobenzylamine, aniline, N-methylaniline, N,N-dimethylaniline, N,N-diethylaniline, N,N-di-propylaniline, iso-butylaniline, toluidines, diphenylamine, hydroxyethylaniline, bis(hydroxyethyl)aniline, chloraniline, aminophenols, aminobenzoic acids and their esters, benzylamine, dibenzylamine, tribenzylamine, methyl dibenzylamine, α-phenylethylamine, xylidine, diisopropylaniline, dodecylaniline, aminonaphthaline, N-methylaminonaphthaline, N,N-dimethylaminonaphthaline, N,N-dibenzylnaphthaline, diaminocyclohexane, 4,4'-diaminodicyclohexyl methane, diaminodimethyldicyclohexyl methane, phenylene diamine, xylylene diamine, diaminobiphenyl, naphthaline diamines, toluidines, benzidines, 2,2-bis(aminophenyl)propane, aminoanisoles, aminothiophenols, aminodiphenyl ether(s), aminocresols, morpholine, N-methylmorpholine, N-phenyl-morpholine, hydroxyethylmorpholine, N-methylpyrrolidine, pyrrolidine, piperidine, hydroxyethylpiperidine, pyrroles, pyridines, quinolines, indols, indolenines, carbazoles, pyrazoles, imidazoles, thiazoles, pyrimidines, quinoxalines, aminomorpholine, dimorpholine ethane, [2,2,2]-diazabicyclooctane, and N,N-dimethyl-p-toluidine.

Preferred amines are aniline derivatives and N,N-bisalkylarylamines, such as N,N-dimethylaniline, N,N-diethylaniline, N,N-dimethyl-p-toluidine, N,N-bis(hydroxyalkyl)arylamines, N,N-bis(2-hydroxyethyl)anilines, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine, and 4,4'-bis(dimethylamino)diphenyl methane.

Polymer amines, as these are obtained by means of polycondensation of N,N-bis(hydroxyalkyl)aniline with dicarboxylic acids or by means of polyaddition of ethylene oxide and these amines, are also suitable as accelerators.

Suitable metal salts are, for example, cobalt octoate or cobalt naphthenoate, as well as vanadium, potassium, calcium, copper, manganese or zirconium carboxylates.

The resin mixture can furthermore contain a co-accelerator, particularly if a transition metal compound is used as the accelerator. Depending on the selected transition metal compound, a person skilled in the art is able to select a suitable co-accelerator, in order to achieve the desired curing properties. If a cobalt compound is used as the accelerator, the co-accelerator is preferably an amine and/or a 1,3-dioxo compound. If a copper compound is used as the accelerator, the co-accelerator is preferably an amine, an acetoacetamide, a potassium salt, an imidazole and/or a gallate or mixtures thereof. If a manganese compound is used as the accelerator, the co-accelerator is preferably a 1,3-dioxo compound, a thiol and/or a potassium or lithium salt, or mixtures thereof. If an iron compound is used as the accelerator, the co-accelerator is preferably a 1,3-dioxo compound and/or a thiol, preferably in combination with an alkali metal salt. Suitable 1,3-dioxo compounds are acetylacetone, acetoacetates and acetoacetamides.

Furthermore, the resin component (A) can contain one or more of the usual polymerization inhibitors. The polymerization inhibitors usually used for radically polymerizable compounds, as they are known to a person skilled in the art, are suitable as polymerization inhibitors.

For stabilization against premature polymerization, resin mixtures and reaction resin mortars usually contain polymerization inhibitors, such as hydroquinone, substituted hydroquinones, for example 4-methoxyphenol, phenothiazine, benzoquinone or tert-butylcatechol, as they are described, for example, in EP 1935860 A1 or EP 0965619 A1, nitroxyl compounds, particularly stable nitroxyl radicals, also called N-oxyl radicals, such as piperidinyl-N-oxyl or tetrahydropyrrol-N-oxyl, as they are described in DE 19531649 A1. 4-hydroxy-2,2,6,6-tetramethylpiperidine-N-oxyl (referred to as TEMPOL hereinafter) is particularly preferably used for stabilization; this has the advantage that in this way, the gel time can also be adjusted.

Preferably, the polymerization inhibitors are selected from among phenolic compounds and non-phenolic compounds, such as stable radicals and/or phenothiazines.

Possible phenolic polymerization inhibitors, which are often a constituent of commercial radically curing reaction resins, are phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidene diphenyl, 1,3,5-trimethyl-2,4,6-tris(3,5-di-tert-butyl-4-hydroxybenzypenzene, 2,2'-methylene-di-p-cresol, catechol and butyl catechols, such as 4-tert-butylcatechol, 4,6-di-tert-butylcatechol, hydroquinones, such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof.

Possible non-phenolic polymerization inhibitors are preferably phenothiazines, such as phenothiazine and/or derivatives or combinations thereof, or stable organic radicals, such as galvinoxyl and N-oxyl radicals. Suitable stable N-oxyl radicals (nitroxyl radicals) can be selected from among 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL), aluminum-N-nitrosophenylhydroxylamine, diethylhydroxylamine, as they are described in DE 199 56 509. Furthermore, suitable N-oxyl compounds are oximes, such as acetaldoxime, acetone oxime, methylethylketoxime, salicyloxime, benzoxime, glyoximes, dimethylglyoxime, acetone-O-(benzyloxycarbonyl)oxime and the like. Furthermore, pyrimidinole or pyridinole compounds substituted in the para position relative to the hydroxyl group, as they are described in the patent application DE 10 2011 077 248 B1, which is not a prior publication, can be used as polymerization inhibitors.

Depending on the desired properties and the use of the resin mixture, the polymerization inhibitors can either be used alone or as a combination of two or more of them. In this regard, the combination of the phenolic and the non-phenolic polymerization inhibitors allows a synergistic effect, as the adjustment of an essentially drift-free setting of the gel time of the reaction resin formulation also shows.

The curing agent contained in the curing component (B) of the two-component mortar mass according to the invention, for the radically polymerizable resin of the resin component (A), preferably comprises at least one organic peroxide, for example dibenzoyl peroxide, methylethylketone peroxide, tert.-butylperbenzoate, cyclohexanone peroxide, lauryl peroxide, cumol hydroperoxide and/or tert.-butylperoxy-2-ethyl hexanoate.

The organic peroxides are preferably phlegmatized, particularly by means of the addition of water as a phlegmatization agent and/or solvent. Suitable curing components are known to a person skilled in the art and are available on the market.

Finally, the two-component mortar mass according to the invention can contain at least one inorganic filler in the resin component (A) and/or in the curing component (B). Examples of suitable fillers are quartz, glass, corundum, porcelain, stoneware, heavy spar, light spar, gypsum, talcum and/or chalk, as well as mixtures thereof, in the form of sands, meals or shaped bodies, preferably in the form of fibers or beads.

According to another preferred embodiment of the invention, the resin component (A) can additionally contain, aside from the radically polymerizable resin, a hydraulically binding or polycondensable inorganic compound, such as cement, preferably iron oxide-free or iron oxide-low cement such as aluminate cement, and/or gypsum, wherein in this case, the curing component (B) also contains additional water for curing of the hydraulically binding or polycondensable inorganic compound, aside from the curing agent and the water required for phlegmatization.

Finally, the mortar mass can contain other usual additives in the resin component (A) and/or in the curing component (B), such as thickeners, liquefiers, and thixotropic agents, such as precipitated or pyrogenic silicic acid, bentonites, celluloses and/or kaolin.

The two-component mortar mass according to the invention is preferably present in shells, cartridges or film bags, which are characterized in that they comprise two or more chambers, separated from one another, in which the resin component (A) and the curing component (B) of the mortar mass are disposed separately from one another, inhibiting a reaction.

The two-component mortar masses according to the invention can advantageously have the following overall composition of resin component (A) and curing component (B):

silanated, radically curable resin 8-30 wt.-%
reactive diluent 4-25 wt.-%
organic peroxide 1-6.5 wt.-%
accelerator 0.01-0.5 wt.-%
thixotropic agent 0-5.0 wt.-%
hydraulically binding or polycondensable material 10-35 wt.-%
mineral fillers 20-55 wt.-%
water 6-20 wt.-%.

For use as intended, the resin component (A) and the curing component (B) are emptied out of the separate chambers and mixed in a suitable apparatus, for example a static mixer. The mixture of resin component (A) and curing component (B) is afterward introduced into the previously cleaned drilled hole by means of a known injection apparatus. Subsequently, the part to be fixed in place is set into the mortar mass and adjusted. The curing agent of the curing component (B) initiates the radical polymerization of the resin component (A), so that the mortar mass cures within a few hours, under ambient conditions. By means of hydrolysis and condensation of the silane groups covalently bonded to the resin of component (A), subsequent cross-linking takes place, thereby achieving permanently high load values even in wet or only insufficiently cleaned drilled holes.

The two-component mortar mass according to the invention not only results in high load values, even in wet drilled holes and/or in the case of poor cleaning of the drilled holes introduced into the mineral substrate. It has surprisingly been shown that these high load values also remain stable over an extended period of time. It can only be assumed that the covalent bond of the silane groups to the radically polymerizable resin already leads to more stable polymer framework before initiation of polymerization than does polymerization of silane compounds into the polymer chains during curing of the mortar mass. At the same time, the silane groups remain sufficiently mobile so that they can yield improved adhesion by means of condensation with one another or with hydroxy groups on the mineral substrate or the fillers of the mortar mass.

Therefore, use of the two-component mortar mass according to the invention, for chemical fastening of parts, particularly threaded anchor rods, iron reinforcement bars, threaded sleeves, and screws, in drilled holes that are present in a mineral substrate, preferably concrete, is also an object of the invention.

Further advantages of the invention are evident from the following examples, which are, however, not to be understood to be restrictive in any way.

EXAMPLE 1

Production of a Reference Resin (UMA-REF)

743.4 g hydroxypropylmethacrylate (HPMA) are completely presented in the reactor, mixed with 0.188 g 4-hydroxy-2,2,6,6-tetramethyl-piperidinyl-1-oxyl (TEMPOL) and 0.0753 g phenothiazines as polymerization inhibitors, as well as 0.151 g dioctyl tin dilaurate (TIB™ KAT 216; TIB Chemicals AG) as an accelerator, and heated to 60° C.

Subsequently, 234.6 g polymethylene polyphenylisocyanate (PMDI) are dripped in while stirring, wherein the internal temperature rises to approximately 80° C.-90° C. After the addition is completed, the batch is still stirred further, until the NCO content has dropped to below 0.3%. In this process, the internal temperature is not allowed to drop below 80° C. The NCO content is determined in known manner, by means of titration (DIN EN 1242).

After completion of the post-reaction, 6.75 g TEMPOL are added and dissolved for 15 min. Subsequently, 25.5 g toluidine are added as an accelerator, and dissolved for about 30 min, while stirring. Afterward, 226 g HPMA and 489 g butane diol-1,4-dimethacrylate (BDDMA) are added as a reactive diluent. The entire reaction batch is cooled to about 30° C., while stirring.

EXAMPLE 2

Production of a Hydroxy-Functional Silane

In a round flask, 114.52 g (1.3 mmol) ethylene carbonate and 287.21 g (1.297 mmol) 3-aminopropyltriethoxysilane (Dynasilan™ AMEO; Evonik) are stirred for 2.5 hours at 35° C. and then for another 12 hours at room temperature. A sample examined in an IR spectrometer shows complete reaction of the ethylene carbonate.

EXAMPLE 3

Production of a Silane-Terminated Urethane (Meth)acrylate Resin (UMA-3)

49.52 g 2-hydroxyethyl(3-(triethoxysilane)propyl)carbamate from Example 2, 71.1 g HPMA and 490 g BDDMA are presented in the reactor, mixed with 0.188 g TEMPOL, 0.0753 g phenothiazines, as well as 0.151 g dioctyl tin dilaurate (TIB™ KAT 216; TIB Chemicals AG), and heated to 50° C. Subsequently, 234.6 g polymethylene polyphenylisocyanate (PMDI) are dripped in while stirring, wherein the internal temperature increases to approximately 80° C.-90° C. Subsequently, 397 g HPMA are added, and stirring continues for another 3.5 hours at 60° C. After completion of the addition, the batch is still stirred further until the NCO content has dropped to below 0.3% (determined by titration according to DIN EN 1242). In this process, the internal temperature is not supposed to drop below 80° C.

After completion of the post-reaction, 6.75 g TEMPOL are added and dissolved for 15 min. Subsequently, 25.5 g toluidine are added and dissolved for about 30 min, while stirring. After that, 226 g HPMA are added. The entire reaction batch is cooled to about 30° C., while stirring.

In the same manner, radically polymerizable resins were produced as resin component (A), with different proportions of hydroxy-functional silane (2-hydroxyethyl-(3-(triethoxysilane)propyl)carbamate) of about 1.6 wt.-%, 3.3 wt.-%, 6.6 wt.-%, and 9.5 wt.-%.

The composition of the resin components UMA-1.5, UMA-3, UMA-6 and UMA-9 as well as of the comparison resin UMA-REF is indicated in the following Table 1.

TABLE 1

| Resin | Comparison UMA-REF [wt.-%] | Comparison UMA-1.5 [wt.-%] | Invention UMA-3 [wt.-%] | Invention UMA-6 [wt.-%] | Invention UMA-9 [wt.-%] |
|---|---|---|---|---|---|
| Basic resin | | | | | |
| 2-hydroxyethyl (3-triethoxysilane)propyl) carbamate | 0 | 1.6 | 3.3 | 6.6 | 9.5 |
| Hydroxypropylmethacrylate | 49.6 | 48.0 | 46.3 | 43.0 | 40.1 |

TABLE 1-continued

| Resin | Comparison UMA-REF [wt.-%] | Comparison UMA-1.5 [wt.-%] | Invention UMA-3 [wt.-%] | Invention UMA-6 [wt.-%] | Invention UMA-9 [wt.-%] |
|---|---|---|---|---|---|
| PMDI | 15.6 | 15.6 | 15.6 | 15.6 | 15.6 |
| TIB KAT 216 (accelerator) | 0.01 | 0.01 | 0.01 | 0.01 | 0.01 |
| Phenothiazine (inhibitor) | 0.01 | 0.01 | 0.01 | 0.01 | 0.01 |
| Reactive diluent | | | | | |
| Butane diol-1,4-dimethacrylate | 32.6 | 32.6 | 32.6 | 32.6 | 32.6 |
| p-Toluidine/(accelerator) | 1.70 | 1.70 | 1.70 | 1.70 | 1.70 |
| TEMPOL (Inhibitor) *) | 0.5 | 0.5 | 0.5 | 0.5 | 0.5 |
| Total, % | 100 | 100 | 100 | 100 | 100 |

*) TEMPOL = 4-hydroxy-2,2,6,6-tetramethyl-piperidinyl-1-oxyl

EXAMPLE 4

Two-Component Mortar Mass on the Basis of a Urethane Methacrylate Resin

First, the resin component (A) of a two-component mortar mass is prepared in that 39.3 g of the resins indicated in the above Table 1, in other words of the comparison resin UMA-REF and of the silane-terminated resins UMA-1,5, UMA-3, UMA-6, and UMA-9, are homogenized with 37.2 g of a quartz sand (for example S32), 20.5 g of an aluminate cement, and 3 g of a hydrophobic pyrogenic silicic acid, in a dissolver, under vacuum, to produce a pasty compound free of air bubbles.

The comparison resin UMA-REF does not contain any alkoxysilane, while the resins UMA-1.5, UMA-3, UMA-6, and UMA-9 each contain the amount indicated of the silane compound covalently bonded with the basic resin. The resin components (A) obtained in this manner are introduced into a cartridge, in each instance.

An aqueous benzoyl peroxide suspension, which contains 64 wt.-% filler in the form of a mixture of quartz meal and pyrogenic silicic acid, 12.4 wt.-% benzoyl peroxide, and water as the remainder, and which is filled into the second cartridge, is used as the curing component (B) of the two-component mortar mass.

For use as a chemical mortar mass for fastening of parts, the resin component (A) and the curing component (B) are pressed out of the cartridges and passed through a static mixer, thereby causing the reaction of these components to start, with curing of the reaction resin and, optionally, of the cement. The reacting compound is injected into the drilled hole, whereupon the part to be fastened is introduced and adjusted.

EXAMPLE 5

To determine the load values achieved with these two-component mortar masses, a high-strength threaded anchor rod M12 is used, which is inserted into a drilled hole having a diameter of 14 mm and a drilled hole depth of 72 mm, filled with the two-component mortar mass according to the invention. After a previously determined curing time at room temperature, the average failure load is determined by means of centrally pulling out the threaded anchor rod, with tight support, and the average failure load of five anchors is determined.

The drilled holes examined were prepared using a hollow drill, in which the drilling dust was already removed during the drilling procedure, by means of a connected vacuum cleaner. In this way, separate cleaning of the drilled hole can be eliminated.

To determine the load values in dry concrete (comparison), the anchor rod was set into the mortar mass, and curing took place for 4 hours at room temperature.

To determine the load values in wet concrete, the drilled holes were filled with water, and afterward the water was allowed to act for one day. Afterward, the water was suctioned away, and the anchor rod was set, using the mortar mass. Hardening of the mortar mass took place at room temperature over 24 hours.

The bond strengths obtained using the mortar formulations described in Example 4, with resin compositions according to Examples 1 and 3, for dry drilled holes and wet drilled holes, are compiled in the following Table 2:

TABLE 2

| | Bond strength [N/mm$^2$] | | |
|---|---|---|---|
| | Dry concrete | Watered concrete | Difference % |
| Comparison UMA-REF | 19.1 ± 1.76 | 9.0 ± 1.56 | 53 |
| Comparison UMA-1.5 | 18.7 ± 1.04 | 7.9 ± 0.86 | 58 |
| Invention UMA-3 | 18.7 ± 1.03 | 14.6 ± 3.36 | 22 |
| Invention UMA-6 | 17.4 ± 0.43 | 11.4 ± 0.94 | 34 |
| Invention UMA-9 | 16.3 ± 1.08 | 10.4 ± 1.84 | 36 |

As can be seen from the above Table 2, the two-component mortar mass according to the invention not only yields improved adhesion of the anchor rods to dry concrete, but also a clearly weaker reduction in the load values when used in wet drilled holds. It can furthermore be seen that the mortar mass UMA-3, with a proportion of only about 3 wt.-% of the silane (2-hydroxyethyl(3(triethoxysilane)propyl)carbamate) covalently bonded to the basic resin yields the best values for load value reduction in wet drilled holes. An increase of the silane proportion to more than about 7 wt.-% does not demonstrate any advantage. The performance improvement of the cured mortar mass is also aging-stable and is still maintained after several weeks.

In the following Table 3, the molar proportions of the NCO groups of the isocyanate used are indicated in a ratio to the proportions of the hydroxy-functional silane compound in the resin compositions according to the invention.

TABLE 3

| Resin | Comparison UMA-REF | Comparison UMA-1.5 | Invention UMA-3 | Invention UMA-6 | Invention UMA-9 |
|---|---|---|---|---|---|
| 2-Hydroxyethyl(3-triethoxysilane)propyl) carbamate, [wt.-%] in the formulation | 0 | 1.6 | 3.3 | 6.6 | 9.5 |
| n (OH), [mol] in the formulation | 0 | 0.052 | 0.107 | 0.213 | 0.307 |
| PMDI, [wt.-%] in the formulation | 15.64 | 15.64 | 15.64 | 15.64 | 15.64 |
| n(NCO), [mol] in the formulation | 1.176 | 1.176 | 1.176 | 1.176 | 1.176 |
| n(NCO)/n(OH) | — | 22.6 | 11 | 5.5 | 3.8 |
| Loads, kN dry concrete | 51.8 | 50.6 | 50.6 | 47.2 | 44.2 |
| Loads, kN watered concrete | 24.3 | 21.5 | 39.6 | 31.0 | 28.2 |

It can be seen that a molar ratio of the NCO groups to the OH groups of the hydroxy-functional silane of between about 15:1 to 5:1 is particularly advantageous for an improvement in the mechanical properties of the cured mortar mass.

The invention claimed is:

1. A two-component mortar mass, comprising:
   a resin component (A), which contains at least one radically curable resin as a curable constituent; and
   a curing component (B), which contains a curing agent for the radically curable resin of the resin component (A);
   wherein the radically curable resin is obtained by reaction of
   an at least difunctional component, which has two or more reactive groups (RG-A),
   with a silane intermediate compound and
   an ethylenically unsaturated compound,
   wherein the silane intermediate compound and the ethylenically unsaturated compound each have active functional groups (AG) that react with the reactive groups (RG-A), causing the formation of a covalent bond,
   wherein the silane intermediate compound is the reaction product of a cyclic organic compound selected from the group consisting of a cyclic anhydride, a cyclic carbonate, a cyclic thiocarbonate, a cyclic carbamate, a cyclic thiocarbamate, a cyclic urea, a lactone, a lactam and combinations thereof with a functionalized silane compound, which has at least one reactive group (RG-B),
   wherein the cyclic organic compound reacts with the reactive group (RG-B) of the functionalized silane compound, causing the formation of the silane intermediate compound having at least one functional active group selected from the group consisting of a carboxyl group, a hydroxy group and an amino group, and
   wherein the silane intermediate compound is reacted in a proportion of at least about 2 wt. % of the resin component (A), with reference to organic constituents of the resin component (A).

2. The two-component mortar mass according to claim 1, wherein the reactive groups (RG-A) are present at most in a stoichiometric ratio relative to the active groups (AG).

3. The two-component mortar mass according to claim 1, wherein the reactive groups (RG-A) are selected from the group consisting of carboxyl groups, isocyanate groups, oxirane groups, imido groups and combinations thereof.

4. The two-component mortar mass according to claim 1 wherein the active groups (AG) are selected from the group consisting of carboxyl groups, hydroxy groups, amino groups, thio groups and combinations thereof.

5. The two-component mortar mass according to claim 1, wherein the functionalized silane compound is a hydroxy silane, mercapto silane, an aminosilane or a mixture thereof.

6. The two-component mortar mass according to claim 1, wherein the functionalized silane compound carries a Si-bound hydrolyzable group.

7. The two-component mortar mass according to claim 1, comprising:
   the resin component (A), which contains at least one radically curable resin as the curable constituent; and
   the curing component (B), which contains a curing agent for the radically curable resin of the resin component (A);
   wherein the radically curable resin is obtained by reaction of an at least difunctional isocyanate with a hydroxy-functional silane and a hydroxy-functional, ethylenically unsaturated compound,
   wherein the hydroxy-functional silane is the reaction product of at least one cyclic compound selected from the group consisting of cyclic carbonates, lactones, and carbamates, with at least one silane compound selected from the group consisting of amino-functional, hydroxy-functional and mercapto-functional silanes, and
   wherein the proportion of the hydroxy-functional silane compound reacted in the resin component (A) amounts to at least 2 wt. %, with reference to the total weight of organic constituents of the resin component (A).

8. The two-component mortar mass according to claim 7, wherein the at least difunctional isocyanate reacted is selected from the group consisting of aliphatic and aromatic isocyanates, isocyanate prepolymers and mixtures thereof.

9. The two-component mortar mass according to claim 7, wherein the hydroxy-functional, ethylenically unsaturated compound reacted is a (meth)acrylic acid ester, containing hydroxyl groups, of two or more multivalent alcohols.

10. The two-component mortar mass according to claim 7, wherein the cyclic compound is reacted with an amino-functional silane compound that contains a primary or secondary amino group.

11. The two-component mortar mass according to claim 7, wherein the cyclic compound is a cyclic carbonate.

12. The two-component mortar mass according to claim 7, wherein the hydroxy-functional silane corresponds to the following Formula (I):

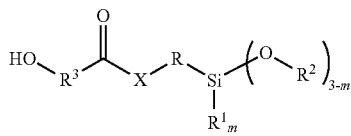 (I)

in which m is 0, 1 or 2,
$R^1$ is an alkyl radical with 1 to 4 carbon atoms,
$R^2$ is an alkyl radical with 1 to 4 carbon atoms,
$R^3$ is a divalent organic radical with 1 to 10 atoms, selected from C, N, S and/or O in the chain,
X means O, $NR^4$ or S,
wherein $R^4$ is a hydrogen atom or an alkyl radical with 1 to 10 carbon atoms, and
R is a difunctional organic group.

13. The two-component mortar mass according to claim 12, wherein $R^3$ possesses a meaning indicated in the following Formula (II):

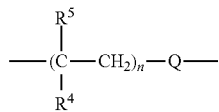 (II)

in which n is a whole number between 1 and 6,
Q stands for a covalent bond, 0 or $NR^4$, and
$R^4$ and $R^5$, independently of one another, are a hydrogen atom or an alkyl radical with 1 to 10 carbon atoms.

14. The two-component mortar mass according to claim 7, wherein the molar ratio of the isocyanate groups to the hydroxy groups of the hydroxy-functional silane is in the range of 23:1 to 3.5:1.

15. The two-component mortar mass according to claim 7, wherein the proportion of the hydroxy-functional silane compound reacted in the resin component (A) amounts to 2 to 7 wt. %, with reference to a total weight of the organic constituents of the resin component (A).

16. The two-component mortar mass according to claim 1, wherein the radically curable resin is obtained by reaction of an at least difunctional epoxy with the silane intermediate compound and a carboxy-functional ethylenically unsaturated compound.

17. The two-component mortar mass according to claim 1, wherein the resin component (A) contains at least one reactive diluent as a further constituent.

18. The two-component mortar mass according to claim 1, wherein the resin component (A) contains at least one accelerator as a further constituent.

19. The two-component mortar mass according to claim 1, wherein the resin component (A) and/or the curing component (B) contains at least one inorganic filler as a further constituent.

20. The two-component mortar mass according to claim 1, wherein the resin component (A) contains a hydraulically binding or polycondensable inorganic compound as a further constituent.

21. The two-component mortar mass according to claim 1, wherein the curing component (B) contains at least one organic peroxide as a curing agent.

22. The two-component mortar mass according claim 1 wherein at least one component of said two-component mortar mass is located in at least one of a shell, a cartridge or a film bag, wherein the resin component (A) and the curing component (B) are disposed in chambers separated from one another.

23. A method for fastening a part, said method comprising:
chemically fastening of said part in a drilled hole which is present in a mineral substrate with the two-component mortar mass according to claim 1,
wherein said part is selected from the group consisting of threaded anchor rods, iron reinforcement bars, threaded sleeves, and screws.

* * * * *